United States Patent

[11] 3,632,018

[72] Inventor Charles W. Ross
       Hatboro, Pa.
[21] Appl. No. 729,968
[22] Filed May 17, 1968
[45] Patented Jan. 4, 1972
[73] Assignee Leeds & Northrup Company
       Philadelphia, Pa.

[54] FEED RATE CONTROL IN A CEMENT KILN
     INCORPORATING DUST RETURN
     6 Claims, 2 Drawing Figs.
[52] U.S. Cl..................................................... 222/1,
       222/56, 222/57, 222/318, 263/32 R
[51] Int. Cl.................................................... F27b 7/32
[50] Field of Search........................................ 222/52, 56,
       129, 135, 145, 318, 57, 1; 263/32

[56]         References Cited
        UNITED STATES PATENTS
2,218,390  10/1940  Alexandria....................  222/56
2,750,182   6/1956  Petersen.......................  263/32
2,980,291   4/1961  Schuerger.....................  222/57 X
3,186,596   6/1965  Badgett........................  222/57 X
3,300,196   1/1967  Bendy..........................  263/32
3,366,374   1/1968  Bay et al......................  263/32
3,437,325   4/1969  Putnam et al.................  263/32

Primary Examiner—Samuel F. Coleman
Assistant Examiner—Frederick R. Handren
Attorneys—William G. Miller, Jr. and Raymond F. MacKay ABSTRACT: A control system for modifying the relationship between the raw material feed rate and the speed of rotation of a rotary cement kiln to which the raw material is fed in order to compensate for the quantity of recirculated dust and changes in the speed of rotation of the kiln.

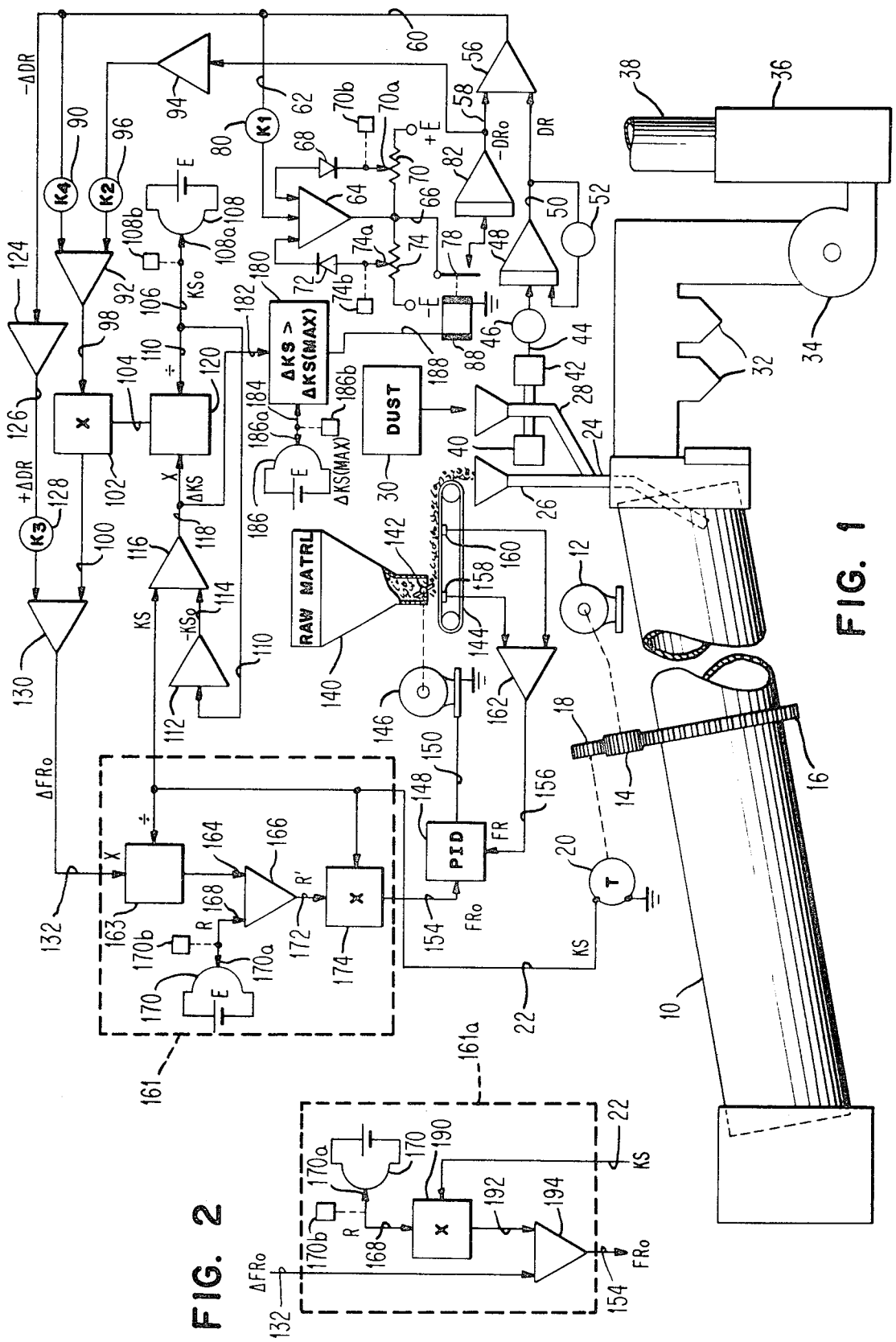

FEED RATE CONTROL IN A CEMENT KILN INCORPORATING DUST RETURN

BACKGROUND OF THE INVENTION

This invention relates to the control of the raw material feed rate to a rotary cement kiln and more particularly to the control of the ratio of the raw material feed rate to the speed of rotation of the kiln when recirculated dust is being returned to the kiln at a variable rate and when the rotation speed of the kiln is subject to variation. The raw material feed rate under those conditions is desirably controlled so as to maintain constant the effective depth of feed in the kiln. The effective depth of feed may be considered as being that total depth of raw material plus dust which if maintained will not produce upsets in kiln operation.

The control of a rotary cement kiln after a disturbance has occurred in the kiln process is usually quite difficult due to the long time responses involved and the fact that the dust action which one may take to correct the disturbance often introduces a new disturbance which can result in a cyclic condition. One type of disturbance which can cause such difficulty is the disturbance introduced due to the variations in the amount of dust returned from the exhaust system of the kiln to the raw material feed. It is, of course, preferred that disturbances in the kiln operation be minimized or prevented. It is therefore desirable to introduce a control which will prevent the variations in the recirculated dust from introducing an adverse disturbance.

One way of accomplishing this objective is to maintain a constant rate of dust return, but that solution would require an expensive "holdup" silo and would also require additional control action so that all the dust can be returned.

It will be evident that if the dust return remains uncontrolled it can lead to a change in the effective mass flow rate of feed down the kiln and that change will ultimately result in a change in the burning zone temperature and hence a change in the clinker quality. The change in clinker quality may, for example, be a change in the free lime or clinker density.

Under normal operating conditions in a rotary cement kiln the rate of dust return may change for many reasons. Some of the reasons for such changes include the nature of the raw feed, the action of the dust collectors, changes in airflow, and changes in the material reaching the cooler, calcining and burning zone.

SUMMARY OF THE INVENTION

In accordance with the present invention there is provided a method for controlling the feed rate of raw material supplied to the rotary cement kiln in relationship to the speed of rotation of the kiln so as to maintain a substantially constant effective depth of feed in the kiln during the period when the available dust is being returned and while the kiln is subject to variations in speed of rotation, This method includes the steps of measuring the mass flow rate of the dust being returned to the kiln as well as measuring the speed of rotation of the kiln. The feed rate of the raw material to the kiln is then modified in accordance with the equivalent contribution to the effective depth of the being dust returned in terms of the raw feed material as well as in accordance with the effect resulting from deviations of the kiln speed from a predetermined desired value.

BRIEF DESCRIPTION OF THE DRAWINGS

FIG. 1 is a diagram of the novel control system in block form.

FIG. 2 shows a modification of a portion of the diagram of FIG. 1.

DESCRIPTION OF THE PREFERRED EMBODIMENTS

In FIG. 1 there is shown a rotary cement kiln 10 which is rotated by motor 12 through the drive gear 14 which engages gear 16. Gear 14 also engages gear 18 to rotate the rotor of tachometer 20 which produces on its output line 22 a signal representative of the speed of rotation of the kiln or, in other words, the kiln speed. The signal on line 22 may, for example, be a voltage which varies in value with the kiln speed.

The kiln 10 provided with a feed duct 24 which is connected to provide a flow path for feed material into the upper end of kiln 10 opposite the end at which the kiln is fired. The feed duct 24 is shown as receiving material from the raw feed duct 26 and the dust feed duct 28 so that the material supplied to the kiln through duct 24 is a mixture of the raw feed material normally supplied for operation of the kiln 10 and dust supplied through the duct 28.

The dust which is supplied through duct 28 is shown in FIG. 1 as coming from a source 30 which for purposes of illustration is shown as a block. The source of this dust which is usually called Buell dust is the dust separators 32 in the exhaust path from the kiln 10. The exhaust path also includes the exhaust fan 34 which connects to the precipitator 36 and the stack 38 to exhaust the gases from the upper end of the kiln.

In some rotary cement kiln processes this dust is recirculated by returning it to the raw feed path of the kiln. In FIG. 1 the means for recirculating this dust is not shown but instead for convenience of illustration it is assumed that there is a variable source of dust 30 for the amount of dust collected will vary and hence the amount being recirculated will normally vary.

The mass flow rate of the dust from its source 30 through duct 28 can be measured by a gamma ray gauge such as shown in FIG. 1. This gauge would consist of a gamma ray transmitter 40 and a gamma ray receiver 42 which produces on its output line 44 a signal indicative of the mass flow rate of dust to the kiln 10. The signal on line 44 is introduced through potentiometer 46 as one input to an integrating amplifier 48. The integrating amplifier 48 produces on its output line 50 a signal DR indicative of the dust rate or, in other words, the mass flow rate for the recirculated dust. As shown in FIG. 1 the output line 50 is connected by way of potentiometer 52 to the input of integrating amplifier 48 so that the amplifier 48 in conjunction with the potentiometers 46 and 52 serve to provide a high frequency filter for the signal on line 44.

The signal on line 50 representing the rate of dust flow is introduced as one input to summing amplifier 56 which has as its other input line 58, which introduces the signal $-DR_0$ representing the negative value representing the average rate of dust flow. Thus, amplifier 56 serves to compare the measured dust rate with the average dust rate so as to provide on its output line 60 a signal $-\Delta DR$ representative of the negative value of the change in such rate from the running average represented by the signal $DR_0$ on line 58.

In order to maintain the signal on line 58 equal to a running average of the rate of dust flow the signal appearing on line 60 is fed by way of line 62 and potentiometer 80 representing the multiplying constant $K_1$ for amplifier 64. Amplifier 64 is an operational amplifier having shunting circuits which provide a means for limiting the magnitude of its output on line 66. The shunting circuit for limiting the negative magnitude of the signal on line 66 consists of diode 68 and potentiometer 70. The potentiometer 70 is connected between line 66 and a source of positive potential +E. The potentiometer tap 70a which is adjusted by knob 70b connects the diode 68 to a variable potential whose magnitude will be determined by the output on line 66. When that varying potential goes negative, the diode 68 becomes conductive in the backward direction and due to the resulting feedback there is a limiting effect on the magnitude of the signal on line 66. Similarly, the positive value of the signal on line 66 is limited by the diode 72 which is connected to potentiometer 74 so that when the output on line 66 is a voltage of positive value exceeding a preset limit as determined by the setting of contact 74a of potentiometer 74 by means of know 74b, there is then a current flow through the diode 72 serving to limit the output on line 66.

Line 66 is connected through a normally closed relay contact 78 to an integrating amplifier 82 and then to line 58.

Thus, the output on line 60 from amplifier 56 is effectively integrated by integrating amplifier 82 to maintain the signal on line 58 equal to a running average of the dust flow rate except when one of the limits as established by the setting of knobs 70b or 74b is exceeded or unless the contact 78 is opened by relay operator 88. AS will be explained in a subsequent portion of the description, the relay operator 88 serves to open the relay contact 78 only when the change in kiln speed exceeds a predetermined change in kiln speed which is indicative of a major disturbance such as a ring break in the kiln. When such major disturbances or process upsets occur, it is, of course, undesirable to continue to modify the average dust rate flow signal on line 58 and thus the line 66 is broken by opening relay contact 78.

The signal on line 60 is introduced through potentiometer 90 which is shown as inserting a constant $K_4$ as a factor in the input of summing amplifier 92 which has as its other input a signal from line 58 which is introduced through sign changing amplifier 94 and potentiometer 96 where the potentiometer inserts the constant factor $K_2$.

The amplifier 92 provides an output on line 98 which is representative of $K_2 DR_0 - K_4 \Delta DR$. The multiplying constants $K_2$ and $K_4$ may be of similar magnitude or of the same magnitude for they represent the effective contribution of the dust to the effective depth of feed in the kiln in terms of the raw feed material. Thus, the output of amplifier 92 on line 98 represents equivalent contribution of the total amount of dust being recirculated to the kiln in terms of the raw feed.

Since the dust which is being recirculated to the kiln will have different characteristics with regard to its effect on the process as compared with the characteristics of the raw material being fed to the kiln, it is necessary to determine what change in raw material feed rate will be necessary to accommodate changes in kiln speed. These changes will be represented by the signal on line 100 shown as an output of multiplier 102 whose inputs are obtained both from line 98 and from line 104. The signal which appears on line 104 is representative of the change in kiln speed divided by the kiln speed set point or, in other words, $\Delta KS/KS_0$. In order to obtain the signal on line 104 to represent that quantity there is provided in signal $KS_0$ on line 106 from the contact of slidewire 108 which shunts the potential source E. The contact 108a of the slidewire 108 is adjusted by knob 108b so that the contact itself is positioned to provide a signal on line 106 representative of the desired or normal kiln speed. The signal on line 106 is supplied to line 110 which provides an input to sign changing amplifier 112 to produce on line 114 the signal $-KS_0$ which is introduced as one input to summing amplifier 116.

Amplifier 116 also has as another input a signal KS from line 22 so that there is provided on the output line 118 the signal $\Delta KS$ representative of the deviation of kiln speed from the set point. The signal on line 118 is divided by the signal on line 110 by the divider 120 which has as its output line 104. AS will be seen from FIG. 1, line 110 is connected as one of the inputs to divider 120, namely the input which represents the divisor.

The signal on line 60 is introduced as an input to sign changing amplifier 124 which provides through its output line 126 and potentiometer 128 an input to summing amplifier 130. The potentiometer 128 inserts a constant $K_3$ which is representative of the equivalent contribution of the dust in terms of the raw feed material.

The amplifier 130 thus provides an output signal on line 132, $\Delta FR_0$, which is equal to $K_3 \Delta DR + [K_2 DR_0 - K_4 \Delta DR] \Delta KS/KS_0$ or, in other words, the change in raw feed rate necessary to maintain a substantially constant effective depth of feed in the kiln under changing dust feed rates and/or kiln rotation speeds.

In FIG. 1 the raw material feed to the kiln is shown as being stored in hopper 140 from which it is supplied through a variably positioned gate valve 142 onto a constantly moving feed belt 144 from which it is deposited into the feed duct 26 through its funnel-shaped opening. In order to control the rate of raw material feed, the control motor 146 is positioned by controller 148 in accordance with signals provided on its output line 150 so that the gate 142 is positioned to maintain a rate of feed material into duct 26 equal to the rate called for by the signal $FR_0$ appearing on line 154.

The controller 148 is shown as a controller having proportional, integral and differential control actions as indicated by the notation "PID." That controller serves to compare the signal on line 154, representative of $FR_0$, with the signal on line 156, which is a feedback signal representing the actual feed rate FR. AS shown in FIG. 1, the signal on line 156 is obtained by summing the outputs of the strain gauge detectors 158 and 160 by means of summing amplifier 162 which incorporates a factor relating the total weight of material on the belt 144 as measured by the sum of the signals from strain gauges 158 and 160 to the actual feed rate corresponding with that weight of material on constantly moving belt 144.

In order to produce the signal $FR_0$ on line 154 from the signal appearing on line 132, namely $\Delta FR_0$, there is utilized a circuit as shown in the block indicated by the dashed lines, namely block 161. This circuit includes a divider 163 which divides the signal on line 132 by the signal on line 22 so as to produce on line 22 so as to produce on line 164 a signal representative of $\Delta FR_0/KS$. The signal on line 164 is supplied as one input to summing amplifier 166. The other input to summing amplifier 166 is the signal R appearing on line 168.

The signal R is obtained from contact 170a on slidewire 170 as determined by the adjustment of knob 170b. The slidewire 170 is shown as shunting a power source E so that there is supplied on line 168 a signal indicative of the normal ratio between the rate of raw feed and the kiln speed in the absence of any recirculating dust. By summing with amplifier 166 the signals on lines 164 and 168 there is obtained on line 172 a signal indicative of the modified ratio $R'$.

The multiplying circuit 174 is operable to multiply the signal $R'$ by the signal KS since it receives inputs from lines 172 and 22 to produce on its output line 154 the signal $FR_0$.

Referring back to the operation of relay actuator 88, it will be evident that comparator 180 is used to compare the signal $\Delta KS$ which appears as one input on line 182 with a signal $\Delta KS$ (max) which appears on another input line 184. The signal $\Delta KS$ (max) is derived from slidewire 186 which has as a power supply the source E and which provides by the positioning of its contact 186a by the knob 186b the signal $\Delta KS$ (max). This signal is normally set at the value established as a maximum change in kiln speed which will be recognized as not indicating a substantial upset in the process. Normally, the kiln speed will be under the control of another control loop not shown in FIG. 1 and will be subject to variation to correct deviations of certain process conditions. Such variations may, in the case of a major upset, be of an excessive magnitude such that it would not be desirable to modify in the control system of FIG. 1 the average dust rate signal $DR_0$. Thus the comparator 180 is connected through its output line 188 to relay operator 88 so as to cause a disconnection of relay contact 78 under the conditions when $\Delta KS > \Delta KS$ (max).

From the above description it will be evident that the modification of the raw material feed rate to correct for the recirculated dust is accomplished by first calculating an average recirculating dust rate $DR_0$ from a measurement of the actual dust rate and utilizing that average value and the measured value to determine the deviation of the measured dust rate from the average value. The deviation of the dust rate from the average value is then utilized by multiplying by a factor indicative of the equivalent contribution of dust in terms of raw material to provide one factor in determining the change in feed rate of the raw material which will be necessary to compensate for the recirculating dust. The other factor which is taken into account is the change in kiln speed from a predetermined set point value. In that connection the ratio of the change in kiln speed to the set point value when multiplied by the equivalent contribution of the total amount of dust being recirculated provides a factor which can be added to the equivalent contribution of the change in the dust rate to give a total change in feed rate necessary to compensate for the recirculated dust. The calculated change in feed rate is then divided by the kiln speed to obtain a factor which can be added to the normal ratio R relating the feed rate and the kiln speed to obtain a new ratio R' indicative of the ratio which should be used to correct for the recirculated dust. The control of the raw material feed is then modified so as to obtain that new ratio by controlling the rate of feed of the raw material itself.

FIG. 2 shows a circuit in block 161a which can be substituted for the circuit in block 161 of FIG. 1 to produce the signal $FR_0$ on line 154 from the signals KS on line 22 and $\Delta FR_0$ on line 132. In the circuit of block 161a the signal R is obtained on line 168 in a manner similar to that shown in block 161 of FIG. 1. However, in block 161a the signal R is by the signal KS by multiplier 190 so as to produce the product on its output line 192 to provide one of the inputs to summing amplifier 194. The other input to summing amplifier 194 is derived from line 132 and the output of amplifier 194 is the signal $FR_0$ which is produced on line 154. Thus, it may be seen that the signal on line 192 produced as an output from multiplier 190 represents the rate of raw material feed which would be required in the absence of any dust recirculation. By use of the summing amplifier 194, that value is added to the value $\Delta FR_0$ representing the change in the raw material feed rate required by the recirculating dust in order to maintain constant the effective depth of feed in the kiln.

It will be evident to those skilled in the art that the several computations and comparisons required to carry out the control of the systems shown in FIGS. 1 and 2 can be readily carried out by the use of digital computer and control means wherein all the computations are carried out by a digital computer.

What is claimed is:

1. A method for controlling the feed rate of raw material to a rotary cement kiln in relationship to the speed of rotation of the kiln to maintain a substantially constant effective depth of the feed in the kiln while feeding to the kiln the available recirculating dust under varying kiln rotation speeds comprising the steps of producing a first signal representative of the mass flow rate of the dust being returned to the kiln.

producing a second signal representative of the average of said mass flow rate of the dust, producing in response to the difference between said first and second signals a third signal representative of the deviation of the mass flow rate of the dust from said average, producing a fourth signal representative of the deviation of the speed of rotation of the kiln from a predetermined set point value, producing a fifth signal representative of the desired change in the rate of feed of the raw material to the kiln to compensate for the rate of dust return and deviations of the kiln speed, said fifth signal being produced by multiplying the third signal by a first constant representative of the equivalent contribution of dust to the effective depth in terms of the raw feed equivalent to the dust and adding a quantity which is the product of the ratio of the fourth signal to the kiln speed set point multiplied by a quantity determined from the difference between the second signal times a second constant and the third signal times a third constant, said second and third constants being approximately equal to said first constant, and 2. A method for controlling the feed rate of raw material to a rotary cement kiln so as to maintain the relationship between the raw material feed rate and the speed of rotation of the kiln at a value such that there is maintained a substantially constant effective depth of feed in the kiln during periods when the available recirculated dust is being fed to the kiln and the kiln is subject to variations in its speed of rotation comprising the steps of producing a first signal representative of the mass flow rate of the dust being returned to the kiln, filtering said first signal by a high-frequency filter, producing a second signal representative of the average of said mass flow rate of the dust being recirculated, producing in response to the difference between said filtered first signal and said second signal a third signal representative of the deviation of the mass flow rate of the dust from said average, said second signal being produced by integrating said third signal so that said second signal becomes effectively representative of a running average of said mass flow rate of dust, producing a fourth signal representative of the deviation of the speed of rotation of the kiln from a predetermined set point value, producing a fifth signal representative of said kiln speed set point value, producing a sixth signal in response to the division of the fourth signal by said fifth signal, producing a seventh signal in response to the sum of said third signal and said second signal as modified by constants representative of the equivalent contribution to the effective depth of said recirculating dust in terms of raw feed material, producing an eighth signal in response to the product of said sixth and seventh signals, producing a ninth signal representative of the desired change in the rate of feed of the raw material to the kiln in response to the sum of said eighth signal and said third signal as modified in accordance with the equivalent contribution to the effective depth made by the dust in terms of raw material, and modifying the rate of feed of said raw material in accordance with changes in said ninth signal to maintain substantially constant the effective depth of feed in the kiln.

3. The method for controlling the feed rate as set forth in claim 2 which includes the steps of means for producing a tenth signal representing a predetermined ratio of the raw material feed rate to the kiln speed, means for producing an eleventh signal by dividing said ninth signal by a signal representative of the measured kiln speed, producing from the sum of said tenth and eleventh signals a modified ratio signal representing the desired ratio between the raw material feed rate and the kiln speed for the maintainence of said substantially constant effective depth of feed in the kiln, and modifying said raw material feed rate to maintain said modified ratio.

4. A method for controlling the feed rate of raw material to a rotary cement kiln in a relationship to the speed of rotation of the kiln to maintain a substantially constant effective depth of the feed in the kiln while feeding to the kiln the available recirculating dust under varying kiln rotation speeds comprising the steps of measuring the mass flow rate of the dust, measuring the speed of rotation of the kiln, and modifying the feed rate of the raw material in accordance with the equivalent contribution in terms of raw feed made by the recirculated dust to the effective depth and in accordance with the deviation of the kiln speed from a particular desired value, including the steps of a. producing a first signal representative of the equivalent contribution due to the change in the return dust in terms of change in the raw feed, b. producing a second signal representative of the change in the raw feed rate necessary to accommodate the effect of a change in kiln speed from its desired value on the effective depth of feed in the kiln, c. producing a third signal in accordance with the sum of said first and second signals, and d. modifying the raw feed rate in response to said third signal.

5. A method for controlling the feed rate of raw material to a rotary cement kiln in a relationship to the speed of rotation of the kiln to maintain a substantially constant effective depth of the feed in the kiln while feeding to the kiln the available recirculating dust under varying kiln rotation speeds comprising the steps of measuring the mass flow rate of the dust, measuring the speed of rotation of the kiln, and modifying the feed rate of the raw material in accordance with the equivalent contribution in terms of raw feed made by the recirculated dust to the effective depth and in accordance with the deviation of the kiln speed from a particular desired value, including the steps of a. producing a first signal representative of the equivalent contribution due to the change in the return dust in terms of change in the raw feed, b. producing a second signal representative of the change in the raw feed rate necessary to accommodate the effect of a change in kiln speed from its desired value on the effective depth of feed in the kiln, c. producing a third signal in accordance with the sum of said first and second signals, and d. modifying the ratio of the raw feed rate to the kiln speed in response to said third signal.

6. The method of claim 5 in which the production of the first signal comprises the steps of producing a fourth signal representative of the equivalent contribution due to the return dust with respect to the raw feed, producing a fifth signal representative of the change in the rate of dust return, and producing said first signal in accordance with the product of said fourth and fifth signals.

* * * * *

PO-1050
(5/69)

UNITED STATES PATENT OFFICE
CERTIFICATE OF CORRECTION

Patent No. 3,632,018        Dated January 4, 1972

Inventor(s) Charles W. Ross

It is certified that error appears in the above-identified patent and that said Letters Patent are hereby corrected as shown below:

Column 1, Line 19,   "dust" should read --control--.
Column 1, Line 29,   No paragraph
Column 1, Line 60,   "being dust returned" should read --dust being returned--.
Column 2, Line 5,   "kiln 10 provided" should read --kiln 10 is provided--.
Column 2, Line 72,   "know" should read --knob--.
Column 3, Line 42,   "in" should read --a--.
Column 4, Lines 23 & 24, delete "so as to produce on line 22".
Column 5, Line 16,   "R is by" should read --R is multiplied by--.
Column 5, Claim 1, Line 67, insert subparagraph
modifying said raw material feed rate in accordance with said fifth signal to thereby maintain a substantially constant effective depth of feed in the kiln.

Signed and sealed this 27th day of June 1972.

(SEAL)
Attest:

EDWARD M. FLETCHER, JR.        ROBERT GOTTSCHALK
Attesting Officer                Commissioner of Patents